(12) United States Patent
Hanwell et al.

(10) Patent No.: US 11,816,813 B2
(45) Date of Patent: Nov. 14, 2023

(54) IMAGE DATA PRE-PROCESSING FOR NEURAL NETWORKS

(71) Applicant: Apical Limited, Cambridge (GB)

(72) Inventors: David Hanwell, Cambridge (GB); Alexey Kornienko, Cambridge (GB); Nerhun Yildiz, Cambridge (GB)

(73) Assignee: Arm Limited, Cambridge (GB)

( * ) Notice: Subject to any disclaimer, the term of this patent is extended or adjusted under 35 U.S.C. 154(b) by 83 days.

(21) Appl. No.: 16/920,163

(22) Filed: Jul. 2, 2020

(65) Prior Publication Data
US 2021/0004941 A1 Jan. 7, 2021

(30) Foreign Application Priority Data

Jul. 4, 2019 (GB) ...................................... 1909642

(51) Int. Cl.
*G06T 5/00* (2006.01)
*G06N 3/08* (2023.01)
(Continued)

(52) U.S. Cl.
CPC ................. *G06T 5/00* (2013.01); *G06N 3/08* (2013.01); *G06T 1/20* (2013.01); *G06T 5/009* (2013.01);
(Continued)

(58) Field of Classification Search
CPC ......... G06T 5/007; G06T 5/008; G06T 5/009; G06T 1/20; G06T 5/50;
(Continued)

(56) References Cited

U.S. PATENT DOCUMENTS

| 6,101,290 A | * | 8/2000 | Easwar | ...................... G06T 1/20 382/293 |
| 2010/0046855 A1 | * | 2/2010 | Marcu | .................. H04N 5/2355 382/284 |
| 2013/0156343 A1 | * | 6/2013 | Hutchings | ................. G06T 7/00 382/286 |

(Continued)

FOREIGN PATENT DOCUMENTS

| CN | 109146824 A | 1/2019 | |
| EP | 3404611 A1 * | 11/2018 | ............... G06T 5/50 |

(Continued)

OTHER PUBLICATIONS

Yan, Qingsen, et al. "Attention-guided network for ghost-free high dynamic range imaging." Proceedings of the IEEE/CVF Conference on Computer Vision and Pattern Recognition. 2019. (Year: 2019).*
(Continued)

*Primary Examiner* — Andrae S Allison
(74) *Attorney, Agent, or Firm* — EIP US LLP

(57) ABSTRACT

An image processor comprising an input module for receiving image data from an image sensor; an image processing module arranged to perform one or more operations on at least a portion of the image data to generate processed image data; and a characteristic processing module arranged to perform one or more characteristic processing operations on at least a portion of the characteristic data to generate processed characteristic data. The portion of the characteristic data is associated with the portion of the image data; the one or more characteristic processing operations are associated with the one or more image processing operations. The image processor further comprises an output module for outputting the processed image data and processed characteristic data.

9 Claims, 4 Drawing Sheets

(51) Int. Cl.
*G06T 1/20* (2006.01)
*G06T 5/50* (2006.01)
*G06V 10/20* (2022.01)

(52) U.S. Cl.
CPC ...... *G06T 5/50* (2013.01); *G06T 2207/20084* (2013.01); *G06T 2207/20208* (2013.01); *G06V 10/20* (2022.01)

(58) Field of Classification Search
CPC ........... G06T 2207/20084; G06T 2207/20088; G06T 2207/20208; G06T 2207/20204; G06T 2207/20201; G06T 7/10; G06T 7/12; G06T 7/13; G06N 3/08; G06N 3/02; G06N 3/06; G06N 7/046; G06V 10/20
USPC ................ 382/274, 155–158, 276, 254, 162, 382/303–304
See application file for complete search history.

(56) References Cited

U.S. PATENT DOCUMENTS

2014/0354778 A1* 12/2014 Kolar ......................... G06T 1/20
348/46
2015/0103920 A1* 4/2015 Rapaka .................. H04N 19/30
375/240.26
2018/0285679 A1* 10/2018 Amitay ................ G06K 9/4642
2019/0130545 A1* 5/2019 Cardei ................. G06K 9/6256
2019/0391587 A1* 12/2019 Uvarov ..................... G06K 9/22
2020/0193566 A1* 6/2020 Croxford ............... G02B 30/22

FOREIGN PATENT DOCUMENTS

EP          3404611 A1    11/2018
WO    WO-2015072306 A1 *  5/2015  ............. G06T 5/008

OTHER PUBLICATIONS

United Kingdom Search and Examination report dated Dec. 20, 2019 for UK Application No. 1909642.9.
European Extended Search report dated Dec. 3, 2020 for EP Application No. 20275115.2.
Dyrmann, Mads, "Automatic Detection and Classification of Weed Seedlings under Natural Light Conditions", Ph.D. Thesis, XP055727022, Mar. 1, 2017, https://pure.au.dk/portal/files/114969776/MadsDyrmannAfhandlingMedOmslag.pdf.

* cited by examiner

IMAGE DATA PRE-PROCESSING FOR NEURAL NETWORKS

CROSS-REFERENCE TO RELATED APPLICATIONS

This application claims the benefit under 35 U.S.C. § 119(a) and 37 CFR § 1.55 to United Kingdom patent application no. GB 1909642.9 filed on Jul. 4, 2019 the entire content of which is incorporated herein by reference.

BACKGROUND OF THE INVENTION

Field of the Invention

The present invention relates to methods, apparatus and systems for pre-processing image data for a neural network.

Description of the Related Technology

Processing image data using a neural network to detect characteristics of the data, e.g. features or objects in the image may be computationally intensive. It is therefore desirable to improve the computational efficiency of systems and methods comprising neural networks, by optimising data provided as an input to the neural network.

SUMMARY

According to a first aspect of the present invention, there is provided an image processor comprising an input module for receiving image data from an image sensor; an image processing module arranged to perform one or more operations on at least a portion of the image data to generate processed image data; a characteristic processing module arranged to perform one or more characteristic processing operations on at least a portion of the characteristic data to generate processed characteristic data, the portion of the characteristic data being associated with at least a corresponding portion of the image data captured by the image sensor; and an output module for outputting processed image data and processed characteristic data to a neural processing unit arranged to generate an output using at least one neural network; wherein the at least one characteristic processing operation is associated with the at least one image processing operation; and the processed image data and processed characteristic data being configured for use by the at least one neural network.

According to a second aspect of the present invention, there is provided a method comprising the steps of obtaining image data from an image sensor; applying at least one image processing operation to at least a portion of the image data to generate processed image data; applying at least one characteristic processing operation to at least a portion of characteristic data to generate processed characteristic data, the portion of characteristic data being associated with at least a corresponding portion of the image data captured by the image sensor; and outputting the processed image data and processed characteristic data for subsequent processing by a neural processing unit, the neural processing unit arranged to generate an output using at least one neural network; wherein: the at least one characteristic processing operation is associated with the at least one image processing operation; and the processed image data and processed characteristic data being configured for use by the at least one neural network.

According to a third aspect of the present invention, there is provided a system comprising an image sensor for capturing image data and associated characteristic data; an image signal processor for receiving the image data and characteristic data from the image sensor, the characteristic data being associated with at least a corresponding portion of the image data captured by the image sensor; applying at least one image processing operation to at least a portion of the image data to produce processed image data; applying at least one characteristic processing operation to at least a portion for the characteristic data, to produce processed characteristic data; and a neural processing unit for generating an output using at least one neural network, wherein the at least one neural network receives the processed image data and processed characteristic data as an input, the processed image data and processed characteristic data being configured for use by the at least one neural network.

According to a fourth aspect of the present invention, there is provided A non-transitory computer-readable storage medium comprising computer-executable instructions stored thereon which, when executed by at least one processor, cause the at least one processor to obtaining image data from an image sensor; applying at least one image processing operation to at least a portion of the image data to generate processed image data; applying at least one characteristic processing operation to at least a portion of characteristic data to generate processed characteristic data, the portion of characteristic data being associated with at least a corresponding portion of the image data captured by the image sensor; outputting the processed image data and processed characteristic data for subsequent processing by a neural processing unit the neural processing unit arranged to generate an output using at least one neural network; wherein: the at least one characteristic processing operation is associated with the at least one image processing operation; and the processed image data and processed characteristic data being configured for use by the at least one neural network.

BRIEF DESCRIPTION OF THE DRAWINGS

Further features and advantages of the invention will become apparent from the following description of preferred embodiments of the invention, given by way of example only, which is made with reference to the accompanying drawings, in which like reference numerals are used to denote like features.

DETAILED DESCRIPTION OF CERTAIN INVENTIVE EMBODIMENTS

Figure 1A:
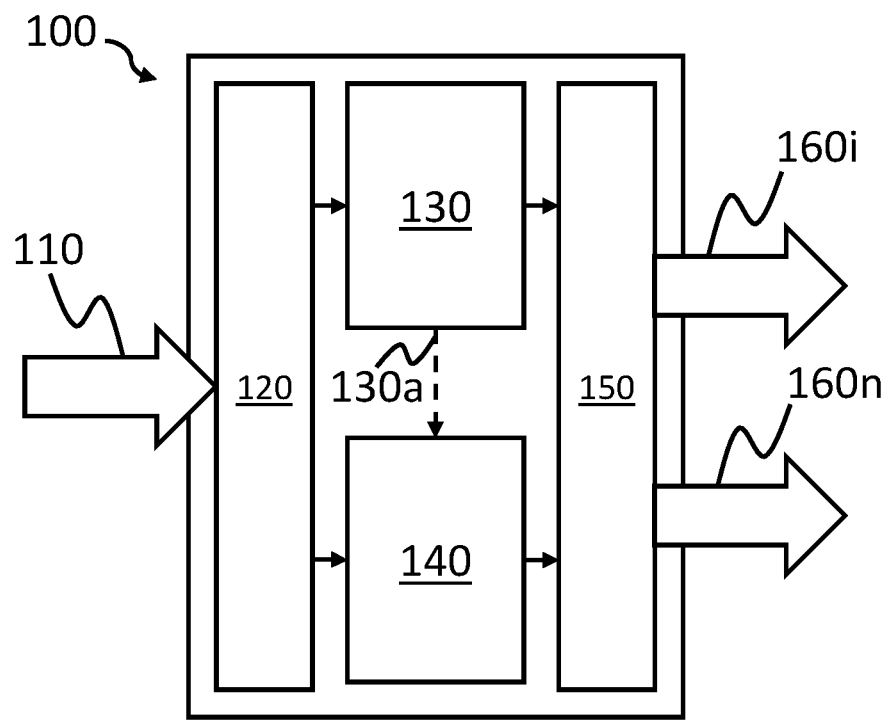
FIG. 1a shows schematically an image signal processor according to a first example.

Details of systems and methods according to examples will become apparent from the following description, with reference to the Figures. In this description for the purpose of explanation, numerous specific details of certain examples are set forth. Reference in the specification to 'an example' or similar language means that a particular feature, structure, or characteristics described in connection with the examples is included in at least that one example, but not necessarily in other examples. It should further be noted that certain examples are described schematically with certain features omitted and/or necessarily simplified for ease of explanation and understanding of the concepts underlying the examples.

Neural networks typically include several interconnected nodes, which may be referred to as artificial neurons, or neurons. The internal state of a neuron (sometimes referred to as an 'activation' of the neuron) typically depends on one or more inputs received by the neuron. The output of the neuron may then depend on the input, a weight, a bias and an activation function. The output of some neurons is connected to the input of other neurons forming a directed, weighted graph in which vertices (corresponding to neurons) or edges (corresponding to connections) of the graph are associated with weights, respectively. The neuron may be arranged in layers such that information may flow from a given neuron in one layer to one or more neurons in a successive layer of the neural networks. Examples include an object classifier executing in a neural network processor, such as a neural network accelerator.

In general, neural networks may undergo what is referred to as a 'training phase', in which the neural network is trained for a particular purpose. As described, a neural network typically includes several interconnected neurons forming a directed, weighted graph in which vertices (corresponding to neurons) or edges (corresponding to connections) of the graph are associated with weights, respectively. The weights may be adjusted throughout training, altering the output of individual neurons and hence of the neural network as a whole. In a convolutional neural network (CNN), a fully connected layer typically connects every neuron in one layer to every neuron in another layer. Fully connected layers may, therefore, be used to identify overall characteristics of an input, such as whether an object of a particular class, or a particular instance belonging to the particular class, is present in an input image, video, or sound as part of an object classification process.

Image signal processors (ISPs) typically receive raw data from an image sensor. The raw data may be in the form of a Bayer pattern. The image sensor may comprise a plurality of pixels arranged in a grid, each pixel being comprised of a photo-diode for converting incident photons into electrons, a capacitor or well for accumulating the electrons, and other components for measuring the charges stored in the capacitor and for converting the amount of charge into a digital value. The image sensor may comprise a colour filter array, such as a Bayer filter mosaic, which arranges various red, green and blue colour filters over the grid of pixels. The arrangement of the filters enables colour image data to be captured by the image sensor.

Each of the components of the image sensor may introduce some noise or error into the values received by the ISP represented as a characteristic of the image data. For example, shot noise may be introduced in the photon count, dark current noise which is independent of the photon count but related to temperature may also be introduced. Similarly, read noise may be introduced, whereby the read noise is related to the analogue-gain used by the sensor. Each type of noise may be readily modelled, for example, shot noise has a Poisson distribution depending on the photon count, and both dark current noise and read noise have a normal distribution.

Thus, each pixel value received by the ISP has a corresponding noise level, which is a function of the image sensor settings and pixel intensity. Operations performed by the ISP on the image data will also have an effect on the noise level, such that at the end of the ISP processing, there is no longer a known relationship between a pixel's value and the degree of noise in that value. For example, operations which apply a gain to a pixel value, such as a shading correction or white balance, will apply a corresponding gain to each pixel's noise level. Since the gains applied vary spatially across the frame, and between colour channels, it is not possible to infer a pixel's noise value from its value alone. This is complicated further when more complex algorithms, such as local tone mapping which applies spatially varying gains that are functions of the data itself, or noise reduction or de-mosaicking algorithms which combine multiple pixel values together are used, or when multi-exposure high-dynamic range (HDR) imaging is used.

The use of CNNs for computer vision tasks is becoming more common, and the images used as inputs in both the training phase and determination or inference phase are typically processed first by an ISP. For the neural network to function well, it must be trained using data which is as similar as possible to the data it will be asked to operate on during the determination phase. As the neural network will be required to operate on image data with a wide range of different noise levels, it must also be trained on image data with a wide range of different noise levels. As such, when operating on a new image, it must correctly infer the noise level in that image so that it can correctly differentiate between noise and image detail. This has a number of drawbacks including that the neural network must be larger because, in addition to performing its primary task, such as object recognition or scene segmentation, it must also first perform the task of noise level prediction. Accordingly, there will be some inherent error in the noise level prediction which, in some examples, could have adverse effects on the primary task and therefore introduce errors into any result.

FIG. 1a shows schematically an ISP 100 according to a first example. The ISP 100 is arranged to receive image data 110 from an image sensor (not shown). The image data 110 may comprise both pixel data and characteristic data. As described above, the pixel data is information relating to the image captured by the image sensor and the characteristic data may be information from some external source, or may generated from the image data using some known characteristics of the sensor and known capture parameters (analogue gain, standard deviation, variance, and exposure masks, et cetera), in other examples the characteristic data may be introduced by components of the image sensor, such as the photon count et cetera. The characteristic data may represent noise data associated with the captured image data, and/or processes applied to the image data 110 by the ISP 100.

The ISP 100 comprises an input module 120 which is arranged to receive the image data 110 captured by the image sensor where the image data 110 comprises the characteristic data, the input module 120 processes the image data to separate the pixel data and characteristic data. Alternatively, the input module 120 is capable of receiving the image data 110 and determining the associated characteristic data for each pixel of the image data 110. As mentioned previously the characteristic data may be determined based on characteristics of the image sensor and can be calculated using normal, Poisson or other distributions. As such, the characteristic data may be determined by the image sensor itself and passed to the ISP 100, or alternatively, may be determined by the input module 120 of the ISP 100 when the image data 110 is received.

The ISP 100 also comprises an image processing module 130 arranged to perform one or more operations on at least a portion of the image data 110. The image processing module 130 processes the image data 110 in a number of image processing blocks wherein, each processing block will be arranged to perform at least one of the operations on the image data 110, such that the image data 110 is modified. For example, the image processing module 130 may be arranged to perform a white balance operation or shading correction operation to the image data 110 which results in a gain being applied to the image data 110. It will be appreciated that other operations may be performed on the image data 110. Such operations will, in turn, affect the characteristic associated with the image data 110. As the characteristic associated with the image data 110 will be affected differently to the image data 110 as a result of the application of the operations to the image data 110, it is extremely difficult to differentiate between the pixel data and the characteristic data, as both will have been adjusted as a result of the operation. Accordingly, it is desirable to know what the final state of the characteristic data would be such that it may be used to extract the underlying pixel data from the processed image data, as will be described in further detail below.

The ISP 100 further comprises a characteristic processing module 140. The characteristic processing module 140 also processes the characteristic data in a number of characteristic processing blocks, each arranged to undertake one or more operations on the characteristic data obtained from the image data 110, or provided by the image sensor as described above. The characteristic processing module 140 is arranged to undertake corresponding operations on the characteristic data to those being performed on the image data 110 by the image processing module 130. The characteristic processing operations undertaken by the characteristic processing module 140, need not be identical to the operations undertaken on the image data 110 by the image processing module 130 but may be different. It is important to note that even if the operations are not identical the effect on the characteristic data is such that the characteristic data accurately represents the characteristic data of the image data 110 following the application of an operation by the image processing module 130.

For some operations undertaken by the image processing module 130, it is not necessary, or desirable for the characteristic processing module 140 to undertake a corresponding operation on the characteristic data. For example, where minor modifications are made to the image data 110, then in order to simplify the number of operations a corresponding operation may not be undertaken by the characteristic processing module 140. This will, of course, have implications on the accuracy of the characteristic data output by the ISP 100.

In some examples, the operations undertaken by the image processing module 130 may not be performed on the entirety of the image data 110, and only performed on a predefined portion. In such examples, the corresponding operations may only be undertaken on a corresponding portion of the characteristic data. In yet other examples, the operations undertaken by the characteristic processing module 140 need not be on a per-pixel basis but may be aggregated into predefined portions or blocks depending on the requirements of the neural processing unit receiving the processed data, as described below. This enables more efficient use of processing resources, as well as a more efficient output for use by the neural processing unit depending on its requirements, thereby reducing the complexity of the neural network.

Figure 1B:
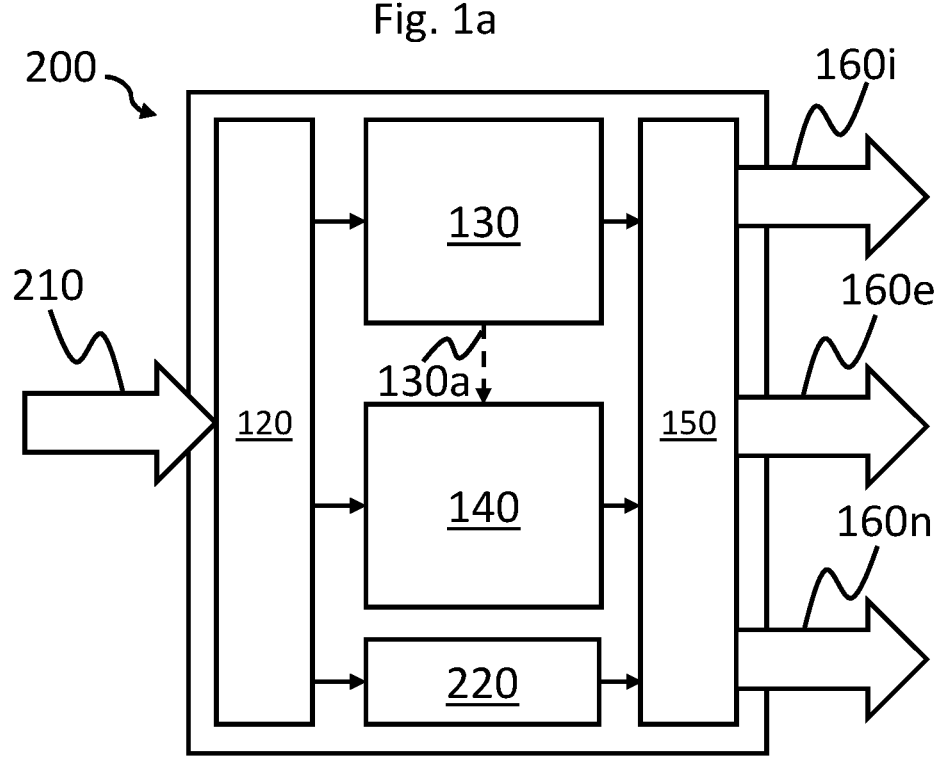
FIG. 1b shows schematically an image signal processor according to a second example.

In some examples, depending on the operation, some outputs, weights, parameters, coefficients, and/or intermediate results generated by the processing module 130 may be provided to the characteristic processing module 140 as indicated in FIGS. 1*a* and 1*b* by the dashed arrow 130*a*. This enables outputs generated in relation to the operations applied to the image data to be used considered when determining outputs in relation to operations applied to the characteristic data. Once the operations on the image data 110 and the characteristic data have been undertaken by the image processing module 130 and characteristic processing module 130, they are provided to the output module 150. The output module 150 provides the processed image data 160*i* and processed characteristic data 160*n* to a neural processing unit (not shown). In some examples, the output module 150 of the ISP 100 may only output portions of the processed image data 160*i* and processed characteristic data 160*n* required by the neural processing unit, thereby further simplifying the operations to be undertaken by the neural processing unit.

FIG. 1*b* shows schematically an ISP 200 according to a first example. The ISP 200 is arranged to receive high dynamic range (HDR) image data 210 from an image sensor (not shown). The ISP 200 comprises a number of the components of the ISP 100 described above in relation to FIG. 1*b*. For example, the ISP 200 comprises an input module 120 for receiving the HDR image data 210, an image processing module 130 for processing the HDR image data 210, a characteristic processing module 140, and an output module 150 for outputting at least the processing image data 160*i* and the processed characteristic data 160*n*.

The ISP 200 is capable of processing high-dynamic range (HDR) image data 200, and as such the image sensor (not shown) is capable of capturing a plurality of single exposure images. For example, the image sensor may be capable of capturing single exposure images with 12-bits dynamic range, at various exposure times such as a long, medium and short exposure time, and then combining them into a single HDR image. In such an example, both the long-medium and medium-short ratios will be 16, therefore the dynamic range is increased by 4 bits for each exposure, totalling 20 bits. The combination of the single exposure images may be undertaken by the image sensor, or in some examples by the ISP 200.

As a result of the combination of the single exposure images, the HDR image data 210 has predictable exposure boundaries. In the example described above, the exposure boundaries would be at 12-bits and 16-bits range, however, following processing of the HDR image data 210 by the ISP 200, the ability to predict the exposure boundaries is lost. This is because the boundaries are mostly a function of the pixel intensity at the input of the ISP 200. However, as the image processing module 130 adjusts and modifies each pixel independently according to pixel location, pixel intensity, and the neighbouring pixel values, the exposure information is lost following the processing.

As such, the ISP 200 comprises an exposure processing module 220 arranged to create an exposure mask 160*e* indicating each pixel's exposure source. The HDR image data 210 is received by the input module 120 and then passed to the exposure processing module 220. The exposure processing module 220 receives the HDR image data 210 from the input module 120 which generates an exposure mask 160*e*. The exposure mask is generated from the HDR image data 210 prior to being processed by the image processing module 130. This ensures that the processing of the HDR image data 210 does not affect the exposure information as described above, and ensures that the output module is able to provide an exposure mask 160*e* containing the necessary information for the neural network to determine the exposure source of each pixel of the HDR image data 210 even after the HDR image data 210 has been processed by the image processing module 130. This also helps to reduce the complexity of a neural network arranged to process the HDR image data 210 as there is no requirement for the neural network to use resources to determine the initial exposure levels of each pixel.

The exposure processing module 220, the image processing module 130 and characteristic processing module 140 are arranged to operate substantially in parallel. For example, the HDR image data 210 may be processed by the image processing module 130 whilst a copy of the HDR image data 210 is used by the exposure processing module 220 to generate an exposure mask 160*e*. The exposure mask 160*e* may then be used by a neural processor unit (not shown) when training a neural network or processing data, meaning that the neural networks and the neural processing unit need not use computational resources to attempt to determine the original exposure information associated with the HDR image data 220, and thereby simplify the neural network.

Figure 2:
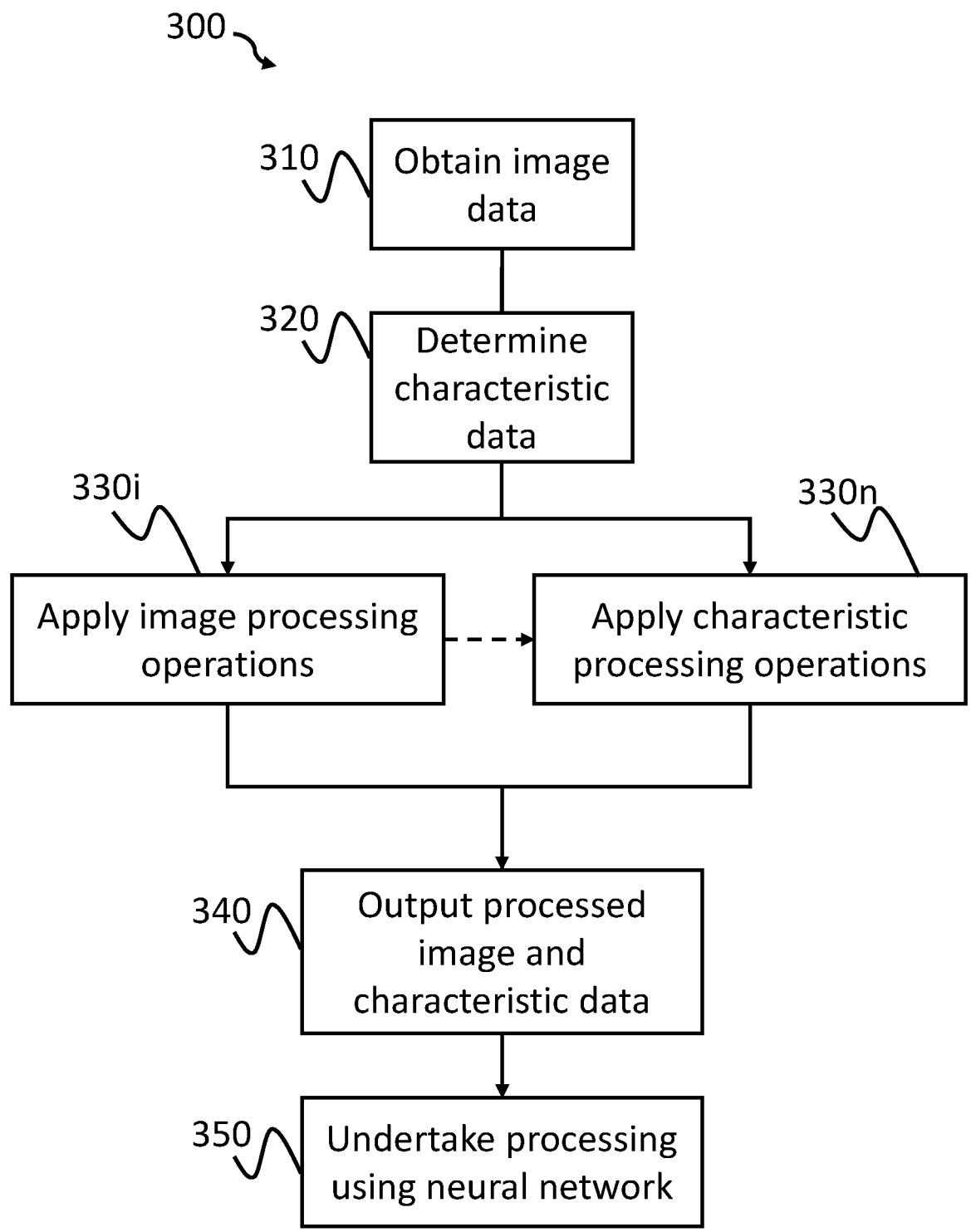
FIG. 2 is a flow diagram showing a method according to an example.

FIG. 2 is a flow diagram showing a method 300 according to an example. At item 310, the method 300 obtains image data. The image data is raw data obtained from an image sensor associated with a system operating the method 300. The image data may comprise a plurality of components including, but not limited to pixel data, and exposure data. The pixel data comprises the information obtained by the individual pixel of the image sensor as described above. In some examples, exposure data may be obtained from HDR images as described above and is used to indicate where the exposure boundaries created by the combining of multiple single exposure images.

Once the image data has been obtained, the method progresses to item 320, where the characteristic data is determined. As described above, the characteristic data is associated with the image data and may be obtained from the image data itself based on the characteristics of the image sensor. The components of the image sensor each introduce different errors/noise in the image data. For example, shot noise may be introduced in the photon count, dark current noise which is independent of the photon count by related to temperature may also be introduced. Similarly, read noise may be introduced, whereby the read noise is related to the analogue-gain used by the sensor. Each type of noise may be readily modelled, for example, shot noise has a Poisson distribution depending on the photon count, and both dark current noise and read noise have a normal distribution. Therefore, it is possible to determine one or more characteristics associated with each pixel in the image data as captured by the image sensor. In some examples, it may not be necessary to determine the characteristic data. The image data itself may comprise an indication of the characteristic data for each pixel.

Once the characteristic data has been determined the method proceeds to items 330*i* and 330*n* which are undertaken in parallel. At item 330*i*, the image data is processed. The processing is undertaken in one or more blocks (as will be described in further detail below with reference to FIGS. 4 and 5), and at each block, an image processing operation is applied to the image data. For example, the image data may be adjusted or otherwise modified by applying an algorithm or operation to alter the exposure, white balance or shading correction for example.

At item 330*n*, the characteristic data determined at item 320, or obtained with the image data at item 310, is processed. Much like the processing of the image data at item 330*i*, the processing is undertaken in one or more blocks, and at each block, a characteristic processing operation is applied to the characteristic data. The characteristic processing operations correspond with the image processing operations applied to the image data at item 330*i*. In some examples, the image processing operations and the characteristic processing operations are substantially similar, however, in other examples, the image processing operations and the characteristic processing operations are not similar, but provide a substantially similar result. That is, for example, where an image processing operation is arranged to correct the white balance of an image the corresponding characteristic processing operation need not be identical, but have an effect on the characteristic data such that the result is processed characteristic data which would be substantially similar to the characteristic data created when the image data as a whole (i.e. including the characteristic data) is processed by an image processing operation arranged to correct the white balance.

In some examples, and as indicated by the dashed arrow, depending on the operation, some outputs, weights, parameters, coefficients, and/or intermediate results generated as a result of applying the image processing operations to the image data at item 330*i* may be provided as an input when applying the characteristic processing operations at item 330*n*. This enables outputs generated in relation to the operations applied to the image data to be used considered when determining outputs in relation to operations applied to the characteristic data.

Once the desired operations have been applied to the image data and the characteristic data, the method progresses to item 340 where the processed image data and processed characteristic data are provided to an output module for outputting to other components of the system, for example, a neural processing unit. At item 350, a neural processing unit, or other processor undertakes further processing on the processed image data and processed characteristic data using a neural network. The processed image data and processed characteristic data being optimised for use with a neural network.

Figure 3:
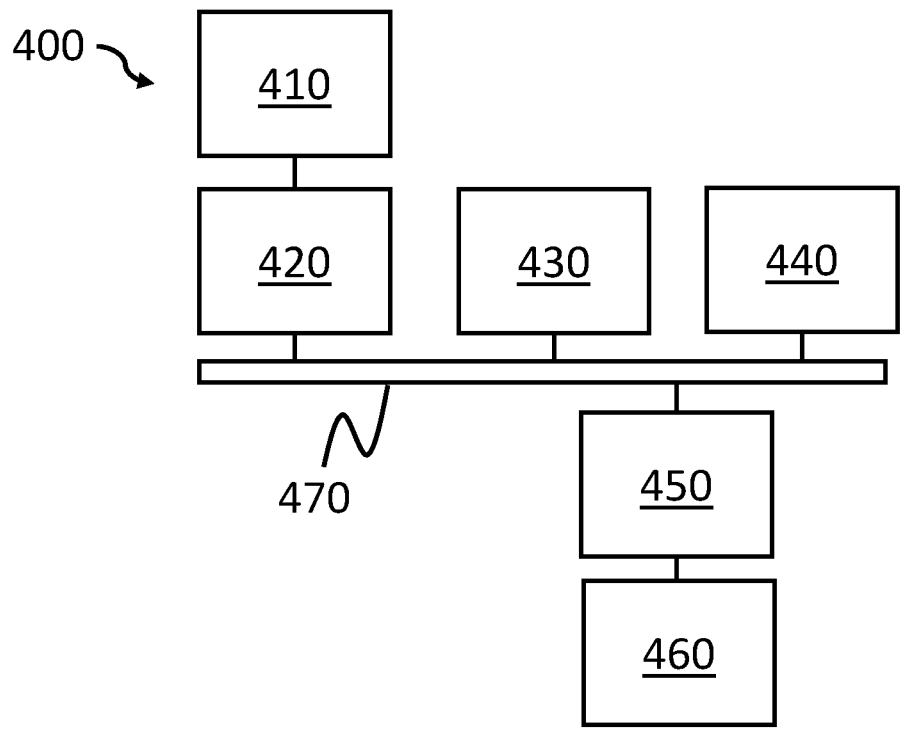
FIG. 3 shows schematically a system for capturing image data using an image sensor and processing the image data using an image signal processor and one or more other processors.

FIG. 3 shows schematically a system 400 for capturing image data using an image sensor 410 and processing the image data using an image signal processor 420 and one or more other processors 430, 440.

The system 400 comprises an image sensor 410, such as the image sensor described above. The image sensor 410 is capable of capturing an image using a plurality of pixels arranged in a grid, each pixel is comprised of a photo-diode for converting incident photons into electrons, a capacitor or well for accumulating the electrons, and other components for measuring the charges stored in the capacitor and for converting the amount of charge into a digital value. The image sensor 410 may comprise a colour filter array, such as a Bayer filter mosaic, which arranges various red, green and blue colour filters over the grid of pixels. The arrangement of the filters enables colour image data to be captured by the image sensor 410. In some examples, the image sensor 410 is capable of capturing a plurality of single exposure images to form an HDR image.

The image sensor 410 is communicably coupled to an ISP 420, such as the ISP described above in relation to FIGS. 1a and 1b. The ISP 420, as described above, is arranged to process the image data captured by the image sensor 410. The ISP 420 applies at least one image processing operation to the image data captured by the image sensor 410, as well as at least one characteristic processing operation on the characteristic data associated with the image data as described above. The characteristic processing operation and the image processing operations need not be identical or even similar, however, the output of the characteristic processing operation is such that it is equivalent to the adjustments made to image data by the image processing operations. In some examples, where the image data is HDR image data, the ISP 420 is arranged to determine the exposure boundaries associated with each of the single exposure images and create an exposure mask indicating each pixel's exposure source.

The system 400 also comprises a neural processing unit 430. The neural processing unit 430 may be a neural network accelerator and include an interface via which inputs to a neural network may be received, for example from the image sensor 410 via the ISP 420 of the system 400. The neural processing unit 430 is a processor dedicated to implementing the classification of data using a neural network trained on a training set of data, and is arranged to receive the processed image data, processed characteristic data, and where appropriate the exposure mask, and use the data as an input to one or more neural networks. The processed image data and processed characteristic data having being optimised for use by a neural network by the image and characteristic processing operations applied by the ISP 420.

In some examples, the system 400 may also comprise one or more other processors 440, such as a central processing unit or a graphics processing unit. The one or more other processors 440, the neural processing unit 430 and the ISP 420 may be combined as a System on Chip (SoC) or onto multiple SoCs to form one or more application processors.

The system 400 also comprises memory 460 for storing at least the image data captured by the image sensor 410 and is accessed via a memory controller 450. The memory may also be arranged to store other information for use by the system 400 for use by any of the neural processing unit 430 or one or more other processors 440.

The memory controller 450 may comprise a dynamic memory controller (DMC). The memory controller 450 is coupled to the memory 460. The memory controller 450 is configured to manage the flow of data going to and from the memory 460. The memory 460 may comprise a main memory, otherwise referred to as a 'primary memory'. The memory 460 may be an external memory, in that the memory 460 is external to the system 400. For example, the memory 460 may comprise 'off-chip' memory. The memory 460 may have a greater storage capacity than the memory cache(s) of the neural processing unit 430 and/or other processors 440. In some examples, the memory 460 is comprised in the system 400. For example, the memory 460 may comprise 'on-chip' memory. The memory 460 may, for example, comprise a magnetic or optical disk and disk drive or a solid-state drive (SSD). In some examples, the memory 430 comprises a synchronous dynamic random-access memory (SDRAM). For example, the memory 460 may comprise a double data rate synchronous dynamic random-access memory (DDR-SDRAM). The memory 460 may be arranged to store image data corresponding to one or more images, each image corresponding to a different frame in a video. The stored image data may correspond to successive images in a video stream. The memory 460 may comprise a frame buffer arranged to store the image data.

One or more of the ISP 420, the neural processing unit 430, the at least one other processor 440, and the memory controller 450 may be interconnected using system bus 470. This allows data to be transferred between the various components. The system bus 470 may be or include any suitable interface or bus. For example, an ARM® Advanced Microcontroller Bus Architecture (AMBA®) interface, such as the Advanced eXtensible Interface (AXI), may be used.

Figure 4:
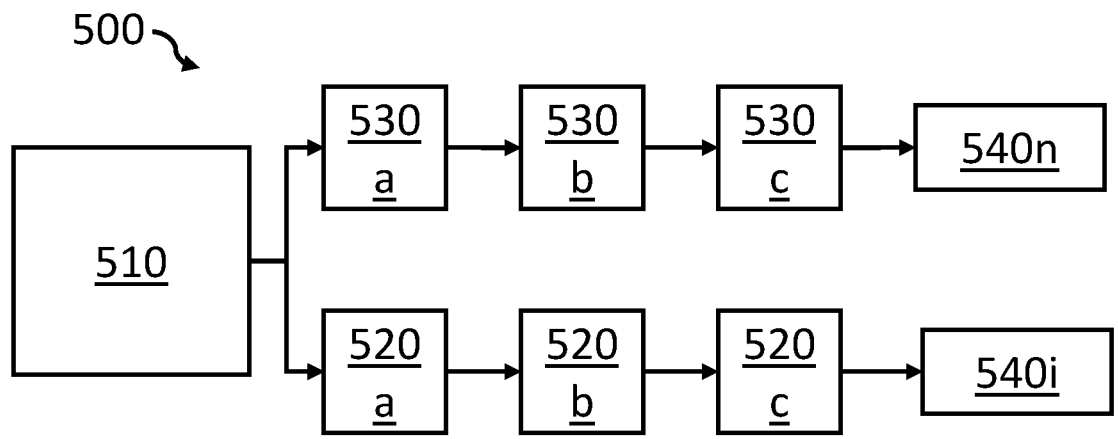
FIG. 4 shows an exemplary processing pipeline according to a first example.

FIG. 4 shows an exemplary processing pipeline 500 according to a first example. The processing pipeline 500 shows the progression and modifications made to image data 510 that has been captured by an image sensor, as it is processed by an ISP, such as the ISP described above in relation to FIG. 1a. Upon receipt of the image data 510, the characteristic data associated with the image data 510 is determined as described above in relation to FIG. 2, or alternatively where the image data 510 already comprises the characteristic data it is separated from the image data 510 such that it is able to have operations applied to it separately. The image data 510 is then processed by a number of image processing blocks 520a, 520b, 520c forming part of the ISP's processing pipeline. Each image processing block 520a, 520b, 520c applies at least one operation to the image data 510 before passing it to the next block. For example, at block 520a a shading correction operation may be applied to the image data 510, the processed image data is then passed to block 520b, where a white balance operation may be applied to the already processed image data, which is then passed to block 520c where a local tone mapping operation is applied to the already processed image data. It will be appreciated that other operations may be applied to the image data 510 and applied in any order.

At substantially the same time as the image data 510 is being processed by blocks 520a, 520b, 520c, the characteristic data is being processed by a number of characteristic processing blocks 530a, 530b, 530c. The characteristic processing block is arranged to apply corresponding operations to the characteristic data. Carrying on from the example above, characteristic processing block 530a would apply an operation substantially similar to the shading correction operation, such that the output of the block 530a substantially represents the state of the characteristic data making up the image data after it has been processed by block 520a. Similarly, characteristic processing block 530b applies an operation substantially similar to a white balance operation, and characteristic processing block 530c applies an operation substantially similar to a local tone mapping operation.

The end result of the processing pipeline is processed image data 540i and processed characteristic data 540n, where the processed characteristic data 540n is representative of characteristics present of the processed image data 540i. This enables a subsequent processor such as a neural processing unit to distinguish between what parts of the processed image data 540i are characteristic and which parts are information to be used when undertaking a task such as training of a neural network or classification by a neural network.

Figure 5:
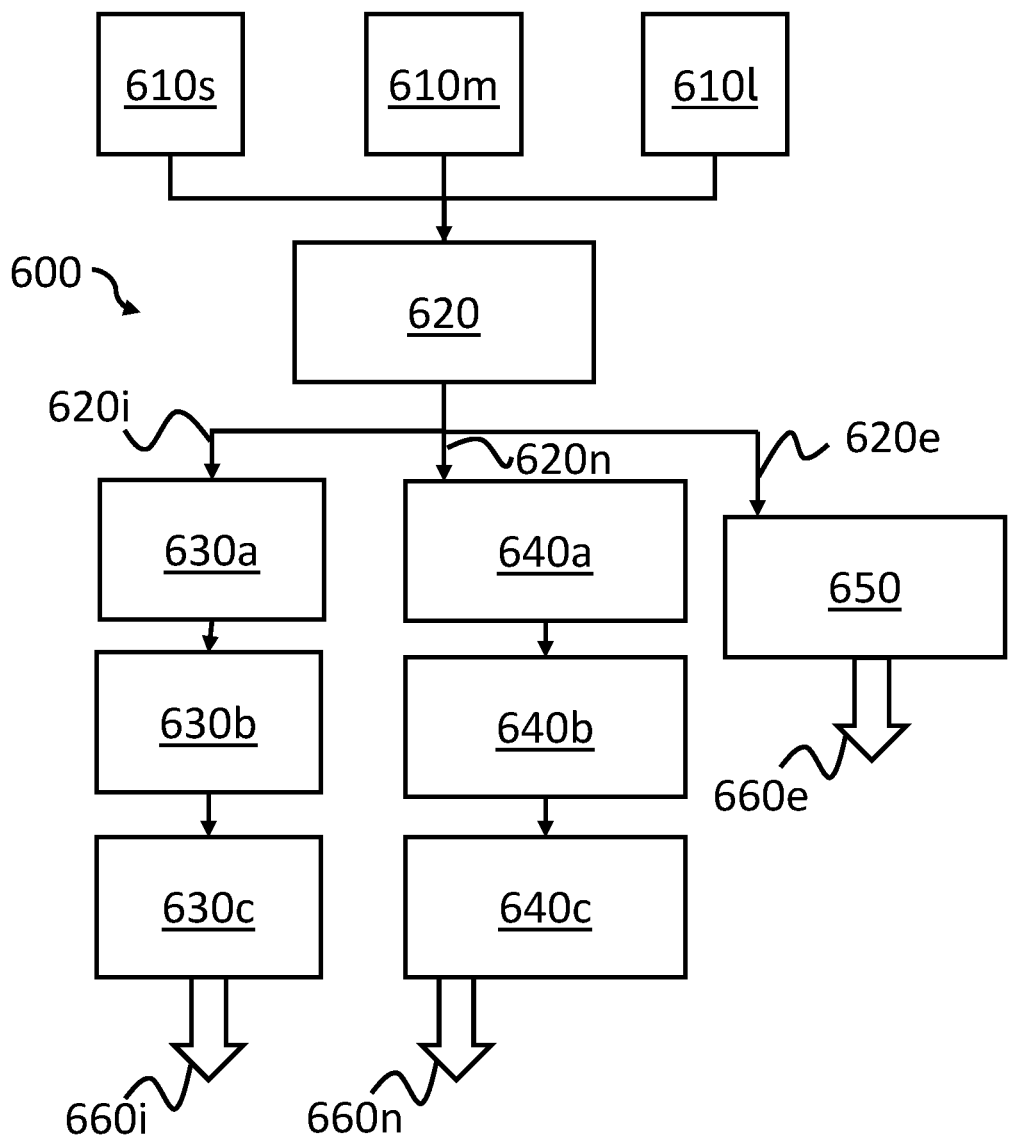
FIG. 5 shows an exemplary processing pipeline according to a second example.

FIG. 5 shows an exemplary processing pipeline 600 according to a second example. The processing pipeline 600 shows the progression and modifications made to HDR image data 620, where the HDR image data 620 comprises a plurality of single exposure images, in this case, image data captured with a short exposure 610s, image data captured with a medium exposure 610m, and image data captured with a long exposure 610l. As described previously, the single exposure images 610s, 610m, 610l are combined into a single HDR image 620. The processing pipeline 600 acts as described above in relation to processing pipeline 500 of FIG. 4. As such, the image processing blocks 630a, 630b, and 630c receive the image data 620i associated with the HDR image 620 and apply at least one image processing operation to the image data 620i. Similarly, the characteristic processing blocks 640a, 640b, 640c receive characteristic data 620n associated with the HDR image 620 and apply at least one characteristic processing operation to the characteristic data 620i. The characteristic processing operations producing a result such that after each processing block, the characteristic data is representative of the characteristic associated with the processed image data output by the corresponding image processing block 630a, 630b, 630c.

The HDR image 620 also comprises exposure information 620e. The exposure information is determined from the HDR image 620 which comprises predictable exposure boundaries. For example, where an image sensor captures single exposure images with 12-bits dynamic range at various exposure times such as a long, medium and short exposure time, both the long-medium and medium-short ratios will be 16, therefore the dynamic range is increased by 4 bits for each exposure, totalling 20 bits. In such an example, the exposure boundaries would be at 12-bits and 16-bits range, however, following processing of the HDR image data 620 by the ISP, the ability to predict the exposure boundaries is lost. This is because the boundaries are mostly a function of the pixel intensity at the input of the ISP, however as the image data 620i is processed by the image processing blocks 630a, 630b, 630c, each pixel is independently adjusted and modified according to pixel location, pixel intensity, and the neighbouring pixel values, the exposure information is lost following the processing.

As such, the processing pipeline 600 comprises an exposure processing block 650 arranged to create an exposure mask 660e indicating each pixel's exposure source. This ensures that the processing of the HDR image 620 does not affect the exposure information as described above, and ensures that the exposure mask 660e is able to be provided to a subsequent processor such that necessary information is available for the neural network.

Each of the examples described above results in the complexity of the neural network being reduced and an increase in the efficiency as there is no requirement for the neural network to determine the characteristic data from the image data, nor determine the exposure information.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An image processor comprising:
an input module for receiving high dynamic range image data from an image sensor, the image data comprising a plurality of pixel data, each having characteristic data associated therewith;
an image processing module arranged to perform at least one image processing operation on at least some of the pixel data of the high dynamic range image data to generate processed image data;
a characteristic processing module arranged to perform at least one characteristic processing operation on at least some of the characteristic data to generate processed characteristic data, wherein the at least some of the characteristic data is associated with the at least some of the pixel data of the high dynamic range image data used to generate the processed image data;
an exposure processing module arranged to generate an exposure mask, the exposure mask being based on at least one exposure boundary of the high dynamic range image data; and
an output module for outputting the processed image data, the exposure mask, and the processed characteristic data to a neural processing unit arranged to generate an output using at least one trained neural network;
wherein:
the at least one characteristic processing operation performed on the at least some of the characteristic data corresponds to the at least one image processing operation performed on the at least some of the pixel data of the high dynamic range image data;
the exposure processing module is arranged to generate the exposure mask in parallel when performing the image processing operation and the characteristic processing operation; and
the processed image data, the exposure mask, and processed characteristic data being configured for use by the at least one trained neural network.

2. The image processor of claim 1, wherein the portion of the image data is a pixel of the image data.

3. The image processor of claim 1, wherein the portion of the image data is a predefined region of the image data.

4. The image processor of claim 1, wherein the at least one image processing operation adjusts the image data, and the at least one characteristic processing operations adjust the characteristic data; wherein the adjustments to the image data and the characteristic data are substantially the same.

5. A method comprising the steps of:
obtaining high dynamic range image data from an image sensor, the high dynamic range image data comprising a plurality of pixel data, each having characteristic data associated therewith;
applying at least one image processing operation to at least some of the pixel data of the image data to generate processed image data;
applying at least one characteristic processing operation to at least some of the characteristic data to generate processed characteristic data, wherein the at least some of the characteristic data is associated with the at least some the pixel data of the high dynamic range image data used to generate the processed image data;
determining exposure data, wherein the exposure data is associated with at least one exposure boundary of the high dynamic range image data;
generating an exposure mask based on the exposure data; and outputting the processed image data, the exposure mask, and the processed characteristic data for subsequent processing by a neural processing unit, the neural processing unit arranged to generate an output using at least one trained neural network;

wherein:

the at least one characteristic processing operation to be performed on the portion at least some of the characteristic data corresponds to the at least one image processing operation performed on the at least some of the pixel data of the high dynamic range image data;

the generation of the exposure mask, the at least one image processing operation, and the at least one characteristic processing operation are performed parallel; and the processed image data, the exposure mask, and processed characteristic data being configured for use by the at least one trained neural network.

6. The method of claim 5, wherein the portion of the image data is a pixel of the image data.

7. The method of claim 5, wherein the portion of the image data is a predefined region of the image data.

8. The method of claim 5, wherein the at least one image processing operation adjusts the image data, and the at least one characteristic processing operations adjust the characteristic data, wherein the adjustments to the characteristic data and the image data are substantially the same.

9. A system comprising:

an image sensor for capturing high dynamic range image data, the high dynamic range image data comprising a plurality of pixel data, each having characteristic data associated therewith;

an image signal processor for:

receiving the image data from the image sensor;

applying at least one image processing operation to at least some of the pixel data of the high dynamic range image data to produce processed image data;

applying at least one characteristic processing operation to at least a portion some of the characteristic data, to produce processed characteristic data, wherein:

the at least some of the characteristic data is associated with the at least some of the pixel data of the high dynamic range image data used to produce the processed image data; and wherein the at least one characteristic processing operation applied to the at least some of the characteristic data corresponds to the at least one image processing operation applied to the at least some of the pixel data of the high dynamic range image data;

determining exposure data, wherein the exposure data is associated with at least one exposure boundary of the high dynamic range image data;

generating an exposure mask based on the exposure data, wherein the generation of the exposure mask, the at least one image processing operation, and the at least one characteristic processing operation are performed parallel; and a neural processing unit for generating an output using at least one trained neural network, wherein the at least one trained neural network receives the processed image data, the exposure mask, and the processed characteristic data as an input, the processed image data and processed characteristic data being configured for use by the at least one trained neural network.

* * * * *